8471X
J. Goulding,
Steam-Boiler Water-Tube.
Patented Oct. 25, 1834.
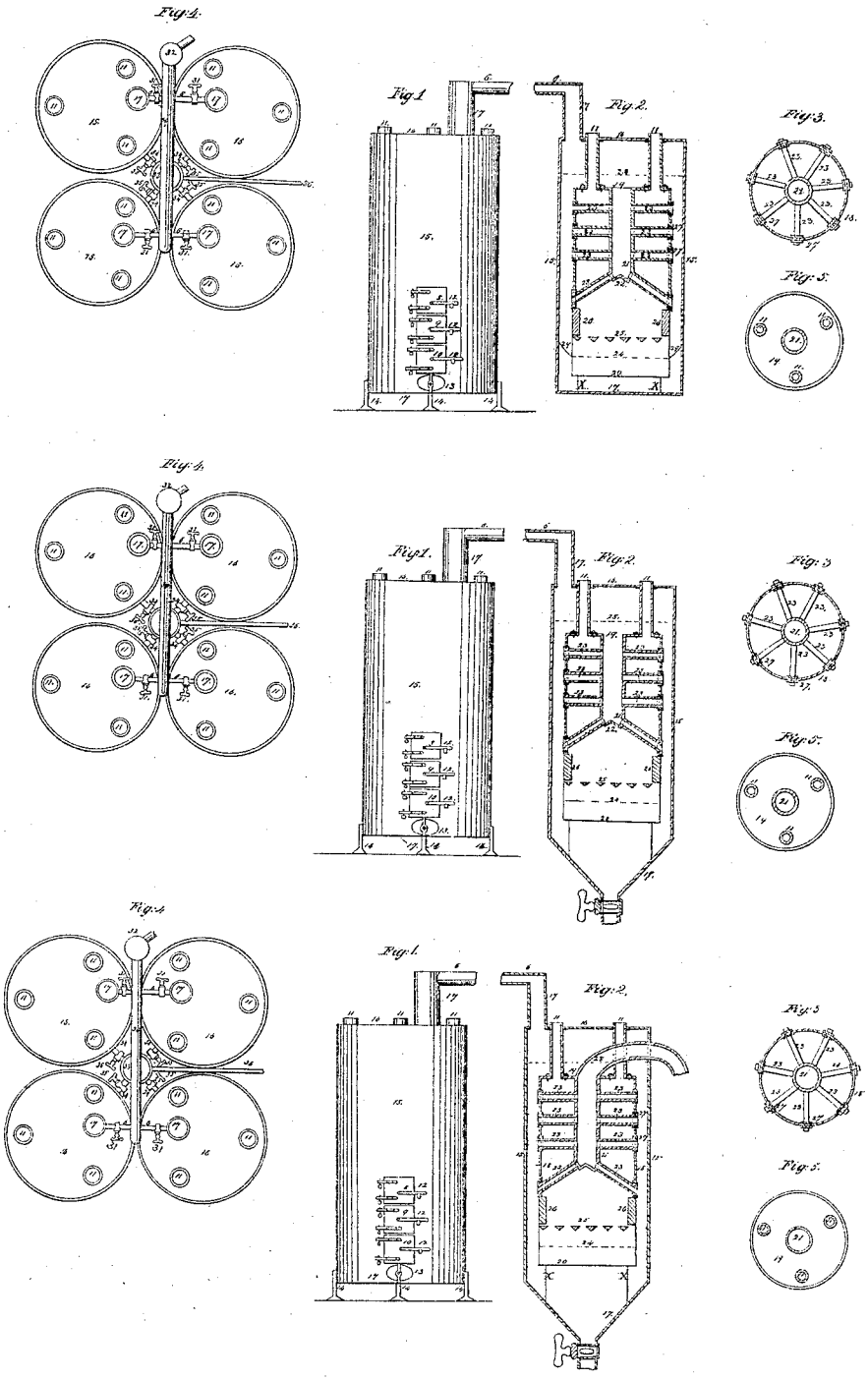
AM. PHOTO-LITHO. CO. N.Y. (OSBORNE'S PROCESS.)

8471X

UNITED STATES PATENT OFFICE.

JOHN GOULDING, OF DEDHAM, MASSACHUSETTS.

IMPROVEMENT IN THE MODE OF MAKING BOILERS FOR GENERATING STEAM AND EVAPORATING WATER OR OTHER FLUIDS.

Specification forming part of Letters Patent dated October 25, 1834.

*To all whom it may concern:*

Be it known that I, JOHN GOULDING, of Dedham, in the county of Norfolk and Commonwealth of Massachusetts, have invented, constructed, and applied to use a new and useful Improvement in the Mode of Making Boilers for Generating Steam and Evaporating Water or other Fluids, which improvement is specified in the words and figures following and in the drawings hereto annexed.

The outside of the boiler consists of an upright cylinder of iron or other metal closed at the top and bottom and supported on legs or standards. This cylinder contains a second cylinder, separated from the first by a space at the top and bottom and all around it. The lower part of the second cylinder contains a fire-grate of its own interior diameter. This second cylinder contains a third cylinder whose upper edge or flange is nearly on a level with the upper edge or flange of the second cylinder and connected with it by a horizontal plate or top, which covers all the space between the second and third cylinders, and is securely fixed to their upper edges or flanges. This third cylinder is about one-half the length of the second, and at its bottom there is placed a conical shaped valve. The space from the top or plate which connects the upper edges or flanges of the second and third cylinders to the bottom of the third cylinder and between them is occupied by pipes disposed in strata or horizontal circles, so that the pipes do not touch each other, nor is any pipe exactly over a pipe in the tier next below it. The inner ends of these pipes are tightly screwed into the third or inmost cylinder. The other ends are fastened into the second cylinder by nuts on its inside and outside. The lowest of the rows of these pipes may have an inclination downward from the bottom of third cylinder. From the plate or top connecting the upper edges of the second and third cylinder tubes or pipes are carried to or through the top of the first cylinder for smoke-pipes. From out the top or head of the first cylinder a funnel is raised, which is a steam-chamber. From the chamber a steam-pipe issues. Above the fire-grate the second cylinder may be lined all around up to the ends of the lowest row of pipes, excepting the doorways, with soapstone or pipe-clay brick. Under the fire-grate may be a finer grate or sifter. At the bottom of the first cylinder there is an aperture opening into the space between the bottoms of the cylinders which may be closed by a head-piece. Over this aperture and in the outside cylinder is a door, over this door another, and over the second a third. These doors communicate with the fire-chamber and with the ash-chamber under it. When this boiler is to be put in operation the fuel may be put upon the grate through the doors marked 8 and 9 in the drawings hereunto annexed. The space between the first and second cylinders to near the top or head of the former. The third or inmost cylinder with the pipes between the second and third cylinders are to be filled with water. By the application of heat the water will be immediately put in motion, and rising in the inmost cylinder will flow over into the space between the first and second cylinders and through the pipes into the inmost cylinder again. The circulation thus created will be continued as long as the heat is applied. The heat and smoke will pass up between the second and third cylinder among the pipes, and the smoke will pass off through the smoke-flue.

The above is a general description of the boiler as improved by me. The boilers may be of any size and contain any number of pipes, and the actual and relative size of the parts may be varied as different purposes may require; but I subjoin a detailed description of one of my boilers six feet in height as explanatory of the mode of constructing them, which for that purpose, with the plates annexed, may be taken as part of this specification.

Figure 1, Plate 1, represents a boiler externally when in position and readiness for use. 15 is the first cylinder or outside case, six feet high and thirty inches in its external diameter. 16 is its top or head, of which a bird's-eye view is given in Fig. 4. 17 is its bottom, and 14 14 are the feet or the standards which support it. 7 is the steam-chamber, about six inches in diameter. 6 is the steam-pipe, from one to two inches in diameter. This steam-chamber and pipe form an outlet for the steam, and on the top of the former a safety-valve is placed. 11 11 11 are the tops of the smoke-pipes raised above the top of the case. 16 8 9 10 are doors each six inches high and six wide. 8 is the fuel-door, through which the grate is generally supplied. 9 is to be used, together with 8, when all the fuel is to be taken out. 10 is the ash-pit door, through which the ashes are removed. 13 is the aperture through which the space between the bottoms of the first and second cylinders may be cleansed. 12 12 12 are door-latches.

Fig. 2 represents a section of the boiler made by a vertical division of it. 18 is the second cylinder, four feet in height and about twenty-seven inches in diameter. 20 is its bottom. X X are its legs or standards, raising it about five inches from 17, the bottom of the first cylinder. The sides of the second cylinder 18 are separated all around from the sides of the first cylinder 15 by a space of one and a half inch. 25 is a grate for fuel, occupying the internal diameter of the second cylinder and raised eight inches from its bottom 20. 26 is the lining of soapstone, extending round the inside of the second cylinder, except at the doors, and is eight inches in height. 24 is a fine grate or sifter, placed four inches above the bottom 20 of the second cylinder, to sift the ashes. 21 is the third or inmost cylinder, twenty-seven inches long and about six and a half inches diameter, made of cast-iron half an inch in thickness. The upper edge of this cylinder is turned into a flange which is bolted securely to 19. The plate, which, extending over the space between the third and second cylinders, is there bolted to the second cylinder by another flange. 11 11 11 are the smoke-pipes, each nineteen inches long and three inches in diameter, which are firmly secured in and through the plate 19, and are carried up through the head of top of first cylinder 16, to which they are also secured, thus forming a passage for the smoke from the pipe-grate 25. 23 23, &c., are the generating or water pipes, made of wrought-iron and welded, three-quarters of an inch in their internal diameter. The inner end of each of these pipes is firmly fixed in the inmost cylinder 21 by a screw cut on the end of the pipe and screwed into the female screw made for it in a hole cut through the side of the said cylinder. The outer end of each of the pipes is fixed in the second cylinder 18 by passing through it and beyond its external surface, and is secured on the outside and inside by nuts 27, &c., brought close to the side of the cylinder. A cement is used to make the cylinder tight at the pipes. There are eighteen tiers of horizontal layers of these pipes. There are thirteen pipes in a tier. Each tier occupies one inch in space, and there is half an inch of space between the tiers. Each pipe is one-eighth of an inch thick, and they are so disposed as not exactly to cover the pipes in the tier next below, the orifices or holes on the external surface of 18 running in spiral lines all around it. The last or lowest tier of pipes may have an inclination downward, so that in evaporating fluids, or when impure water is used, the precipitate or sediment may be less liable to accumulate in the bottom of the cylinder 21. As these inclined pipes are constructed with more difficulty the purpose may be answered by a smaller number of them than in any other tier. 22 is a conical-shaped valve at the bottom of cylinder 21, by removing which the cylinder can be examined and, if necessary, cleaned. The space covered or occupied by the doors 8 9 10 is undivided and surrounded by a cast-iron frame filling the space between the first and second cylinders by its thickness, and is one inch and a half in width and bolted or riveted through the first and second cylinders. The doors are so thick as to occupy all the space from the external surface of the first to the internal surface of the second cylinder. In making these boilers screw-bolts may connect 15 and 18 all around and cross above the tops of the second and third cylinders from one side to the other of the first cylinder at proper distances to give strength and safety against bursting. In evaporating fluids and when impure water is used the precipitate or sediment will be deposited between the bottoms of the first and second cylinders, where it may be taken through the aperture 13. Where pure water only is used, the boiler may be terminated at 29 and the cost of the parts below may thus be diminished.

Fig. 3 is a horizontal section of the second and third cylinders and the pipes between them 23 23, &c., are the generating-pipes. 27, &c., are the nuts to secure them.

In Fig. 4, 16 is a bird's-eye view of the top head of the outside cylinder.

The bottom 17 of the cylinder 15 may be conical-shaped, and at the lowest part thereof a large stop-cock may be inserted, as represented in Fig. 2, Plate 2, through which the sediment or the fluid itself, if necessary, may be drawn off without suspending the operation of the boiler.

If the boiler is used for evaporating brine or for any similar purpose the cylinder 21 may be extended in a curved line over the head or plate 19 and through the side of the outer cylinder 15, as represented in Fig. 2, Plate 3, and turned downward into the water in an evaporator to prevent evaporation in the boiler. The under side of the curved pipe or cylinder shoulder be a little higher than the surface of the fluid in the boiler. The fluid by the act of ebullition will flow through the pipe outward, and it may afterward be returned into the boiler near the bottom for reheating. The height of the pipe above the fluid in the boiler must be regulated according to relative size of the cylinder and pipe 21 compared with the capacity of the rest of the boiler.

That part of the above-described boiler which I herein claim as my improvement, and for which I now claim Letters Patent, is—

The extension of the cylinder 21 over the head or plate 19 and through the outside of the cylinder 15, so that the water or other fluid when raised above a boiling heat may be thrown out of the boiler by its own ebullition.

JOHN GOULDING.

Witnesses:
HORACE MANN,
CHARLES EDWARD RAHN.